United States Patent
Subramanya et al.

(10) Patent No.: US 9,083,690 B2
(45) Date of Patent: Jul. 14, 2015

(54) COMMUNICATION SESSION TERMINATION RANKINGS AND PROTOCOLS

(71) Applicant: ORACLE INTERNATIONAL CORPORATION, Redwood Shores, CA (US)

(72) Inventors: Ramya Kukkehali Subramanya, Bangalore (IN); Stephen Mathew, Bangalore (IN); Vipin Anaparakkal Koottayi, Kerala (IN)

(73) Assignee: Oracle International Corporation, Redwood Shores, CA (US)

( * ) Notice: Subject to any disclaimer, the term of this patent is extended or adjusted under 35 U.S.C. 154(b) by 192 days.

(21) Appl. No.: 13/754,314

(22) Filed: Jan. 30, 2013

(65) Prior Publication Data

US 2014/0215548 A1    Jul. 31, 2014

(51) Int. Cl.
  *H04L 29/06* (2006.01)
(52) U.S. Cl.
  CPC ............... *H04L 63/08* (2013.01); *H04L 63/10* (2013.01); *H04L 63/105* (2013.01)
(58) Field of Classification Search
  CPC ....... H04L 63/08; H04L 63/10; H04L 63/105; H04L 29/06
  USPC ......................................................... 726/1–5
  See application file for complete search history.

(56) References Cited

U.S. PATENT DOCUMENTS

| | | | |
|---|---|---|---|
| 7,439,937 B2 * | 10/2008 | Ben-Shachar et al. ......... 345/1.1 |
| 7,774,356 B2 * | 8/2010 | Cui ............................... 707/769 |
| 7,908,380 B1 | 3/2011 | Chu et al. |
| 2004/0006625 A1 | 1/2004 | Saha et al. |
| 2006/0075106 A1 * | 4/2006 | Hochmuth et al. ........... 709/227 |
| 2006/0277600 A1 | 12/2006 | Goodwill et al. |
| 2007/0058645 A1 * | 3/2007 | Nannra et al. ................ 370/401 |
| 2007/0147247 A1 | 6/2007 | Kalonji et al. |
| 2008/0026724 A1 | 1/2008 | Zhang |
| 2009/0067423 A1 | 3/2009 | Visser |

(Continued)

OTHER PUBLICATIONS

Schulzrinne, H., et al., "Communications Resource Priority for the Session Initiation Protocol (SIP)", The Internet Engineering Task Force of The Internet Society, Feb. 2006, 36 pages. Retrieved from http://tools.ietf.org/html/rfc4412 on Jul. 13, 2012.

(Continued)

*Primary Examiner* — William Powers
*Assistant Examiner* — Tongoc Tran
(74) *Attorney, Agent, or Firm* — Kilpatrick Townsend & Stockton LLP (57) ABSTRACT

A method of handling a plurality of session requests at an access manager may include assigning a rank to each of a plurality of agents. Each of the plurality of agents may forward requests for protected resources to the access manager for authentication and/or authorization, and the access manager may establish a plurality of sessions. The method may also include establishing a first session that is associated with a first agent in the plurality of agents that is assigned a first rank, a first user device, and/or a user credential. The method may additionally include receiving a request to establish a second session that is associated with a second agent in the plurality of agents that is assigned a second rank, a second user device, and/or the user credential. The method may further include determining whether the second session should be established.

20 Claims, 7 Drawing Sheets

(56) References Cited

U.S. PATENT DOCUMENTS

2009/0070417 A1    3/2009    Bao et al.
2009/0201847 A1    8/2009    Yabo et al.
2010/0011378 A1    1/2010    Chen
2012/0023573 A1*  1/2012    Shi .................................. 726/17

OTHER PUBLICATIONS

Author Unknown, "Quest Enterprise Single Sign-On 8.0.3", Quest Software, Jan. 2010, 165 pages. Retrieved from http://us downloads.quest.com/Repository/support.quest.com/Quest%20Enterprise%20Single%20Sign-On/8.0.3/Documentation/E-SSO_SSOWatchAdminGuide.pdf on Jul. 13, 2012.

Wanjun, Y., et al., "Research on Security Status Recovery in Temporal Role-Based Access Control System", Proceedings of the 2009 International Conference on Information Management, Innovation Management and Industrial Engineering, 2009, Vo. 1, pp. 27-29. Retrieved from http://dl.acm.org/citation.cfm?id=1678014 on Jul. 13, 2012.

Author Unknown, "Understanding Session Policy Priority on Different Bind Points", Citrix, Feb. 4, 2010, 2 pages. Retrieved from https://support.citrix.com/article/CTX117236/ on Jul. 13, 2012.

* cited by examiner

COMMUNICATION SESSION TERMINATION RANKINGS AND PROTOCOLS

BACKGROUND

Access management is critical to any effective identity and security strategy, but the complex nature of access management continues to challenge Information Technology (IT) departments. Securing access to a diverse set of applications, services and data is particularly complex given the expansive nature of Internet technologies. The emergence of cloud computing, mobile computing, and social identity technologies has only heightened the need for access controls, because these technology trends are transforming the way organizations access and expose business critical services and data.

As access management requirements have evolved, IT departments have often deployed a mix of point solutions, each of which met some critical requirement for application and information security. This patchwork of access management technologies has left IT with highly complex environments to manage, stretching IT resources and budgets and hindering the ability of IT to meet the needs of the business. With urgent demands for new IT services, departments in many organizations bypass IT altogether. The concept of "Shadow IT," often associated with Software-as-a-Service, is causing major security and governance concerns for organizations.

Over the past 15 years, the market has produced a collection of point products for access management, which operate independently to fulfill specific access requirements for each protected domain or resource. However, such an independent approach is not viable to satisfy requirements for Enterprise Software Systems of the future, which are demanding increased interoperability to achieve a seamless experience. In many areas, this change is being driven by the advent of cloud and mobile computing, which has transformed the way organizations access and expose business-critical applications, services, and data. Additionally, pressure to leverage social identities is taxing traditional access management deployments and highlights the need for improvements in the art.

BRIEF SUMMARY

In one embodiment, a method of handling a plurality of session requests at an access manager may be presented. The method may include assigning a rank to each of a plurality of agents. Each of the plurality of agents may forward requests for protected resources to the access manager for authentication and/or authorization, and the access manager may establish a plurality of sessions between user devices and the plurality of agents. The method may also include establishing, by the access manager, a first session that is associated with a first agent in the plurality of agents that may be assigned a first rank, a first user device, and a user credential. The method may additionally include receiving a request to establish a second session that is associated with a second agent in the plurality of agents that may be assigned a second rank, a second user device, and the user credential. The method may further include determining whether the second session should be established based on the first rank and the second rank.

In some embodiments, the first rank may indicate that the first session should always receive precedence. The first session may include a file transfer through the first agent. The access manager may be configured to allow only a single session per credential. The first device may comprise a computer terminal and the second device comprises a smart phone. The first rank may be based on an authentication policy associated with the first agent. The first rank may be based on a security level of a resource protected by the first agent. The first rank may be based on a resource type of a resource protected by the first agent. The first session may also be associated with a third agent having a third rank, and the determining as to whether the second session may be established may also be based on a combination of the first rank and the third rank. The first agent and the second agent may be the same agent. The first agent may comprise a WebGate. The second agent may comprise a gateway controlling access to an application hosted by an Enterprise Software System.

In some embodiments, the method may also include, in response to a determination that the second session should be established, terminating the first session. The method may additionally include, in response to a determination that the second session should not be established, sending an indication to the second user device indicating that the second session has been refused.

In another embodiment, a computer-readable memory may be presented. Then computer-readable memory may comprise a sequence of instructions which, when executed by one or more processors, causes the one or more processors to handle a plurality of session requests at an access manager. The instructions may cause the processor(s) to assign a rank to each of a plurality of agents. In some embodiments, each of the plurality of agents may forward requests for protected resources to the access manager for authentication and/or authorization, and the access manager may establish a plurality of sessions between user devices and the plurality of agents. The instructions may also cause the processor(s) to establish, by the access manager, a first session that may be associated with a first agent in the plurality of agents that is assigned a first rank, a first user device, and a user credential. The instructions may additionally cause the processor(s) to receive a request to establish a second session that may be associated with a second agent in the plurality of agents that is assigned a second rank, a second user device, and the user credential. The instructions may further cause the processor(s) to determine whether the second session should be established based on the first rank and the second rank.

In yet another embodiment, a system may be presented. The system may include one or more processors and a memory communicatively coupled with and readable by the one or more processors. The memory may comprise a sequence of instructions which, when executed by the one or more processors, cause the one or more processors to handle a plurality of session requests at an access manager. The instructions may cause the processor(s) to assign a rank to each of a plurality of agents. In some embodiments, each of the plurality of agents may forward requests for protected resources to the access manager for authentication and/or authorization, and the access manager may establish a plurality of sessions between user devices and the plurality of agents. The instructions may also cause the processor(s) to establish, by the access manager, a first session that may be associated with a first agent in the plurality of agents that is assigned a first rank, a first user device, and a user credential. The instructions may additionally cause the processor(s) to receive a request to establish a second session that may be associated with a second agent in the plurality of agents that is assigned a second rank, a second user device, and the user credential. The instructions may further cause the processor(s) to determine whether the second session should be established based on the first rank and the second rank.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein, are embodiments for managing communication sessions between user devices and agents based on session rankings. Each agent may be associated with a rank that is either predetermined or dynamically assigned. Session ranks may be based on the ranks of one or more agents associated with the session. The agents may intercept and forward requests for protected resources to an access manager. The access manager may authenticate and/or authorize access to the protected resources based on a user credential. The access manager also may determine when multiple sessions are being requested by the same user. In accordance with a security policy, the access manager may limit the number of sessions that are allowed per user credential. The access manager may then terminate existing sessions or refuse the creation of a new session.

Modern Enterprise Software Systems (ESSs) may provide access to many different resources residing on different servers. For example, an ESS may provide access to Enterprise applications, web-based applications, and/or mobile applications. In some embodiments, a security paradigm may be used wherein protected resources, such as applications and data, are protected by an agent, such as a Web gate. A user device may send a request to access a protected resource. The request may be intercepted by an agent that protects the corresponding resource and forwarded to the access manager. The access manager may handle authentication and/or authorization for the ESS. Central management of authentication and/or authorization can facilitate the use of single sign-on (SSO) capabilities throughout the ESS domain.

The access manager may request credentials from a user, or may receive credentials provided through the agent from the user. If the user is properly authenticated, and the user is authorized to access the protected resource, the access manager may establish a communication session between the user device and the protected resource. In different embodiments, the communication session may involve the access manager, the agent, and/or other ESS systems. In one embodiment, the communication session may be directly established between the user device and the protected resource. In some embodiments, the communication session may be associated with a plurality of agents, as well as with a single user device. The user device may have stored thereon a cookie or other indicator used to identify, maintain, and/or access the communication session.

Due to the advance of mobile computing devices and the increased demand for resource access, protected resources may be accessible through a number of different types of user devices. For example, a user device may include a smart phone, a tablet computer, a laptop computer, a desktop computer, a thin client, a server, a workstation, a PDA, and/or the like. In many cases, a single user may access protected resources within the ESS using multiple devices similar to those described above. This may lead to cases where a user attempts to establish multiple communication sessions with different devices. For example, a user may access an Enterprise resource from a desktop workstation, while also attempting to access a mobile application using a smart phone. Inherently, allowing multiple communication sessions decreases the security of the authentication process. Multiple devices with open communication sessions can be more likely to be misused, misplaced, stolen, or otherwise compromised.

In some embodiments, a security policy may be implemented by the access manager. The security policy may limit the number of sessions that a user is allowed to maintain at any given time. In some embodiments, the security policy may dictate that only a single communication session can be maintained at any time for particular user. The security policy may also describe certain types of data and application interactions that are allowed.

According to the security policy, when a request is received from a user to establish a communication session, the access manager may first determine whether an existing communication session is already associated with the particular user. The access manager may then determine if establishing the new communication session would violate the security policy's limitation on open communication sessions per user. If the security policy is not violated, the new communication session may be established. However, if the security policy is violated, then the access manager may refuse the new communication session request. Alternatively, the access manager may terminate an existing communication session and establish the new communication session. Whether to establish a new communication session or to terminate an existing communication session may be determined based on a rank assigned to each session. Embodiments will be described in greater detail below.

Figure 1:
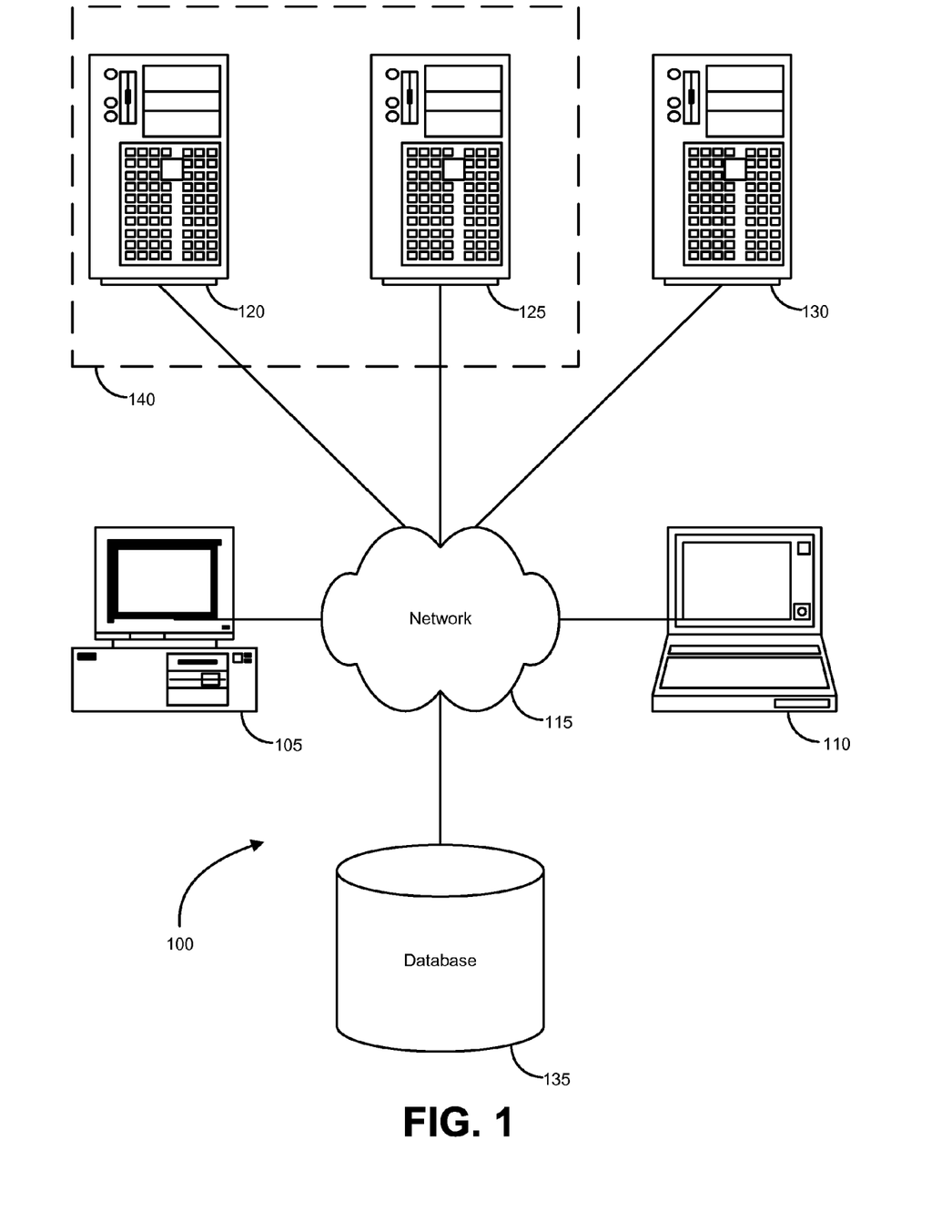
FIG. 1 illustrates a block diagram of components of an exemplary operating environment in which various embodiments of the present invention may be implemented.

Each of the embodiments disclosed herein may be implemented in a computer system. FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
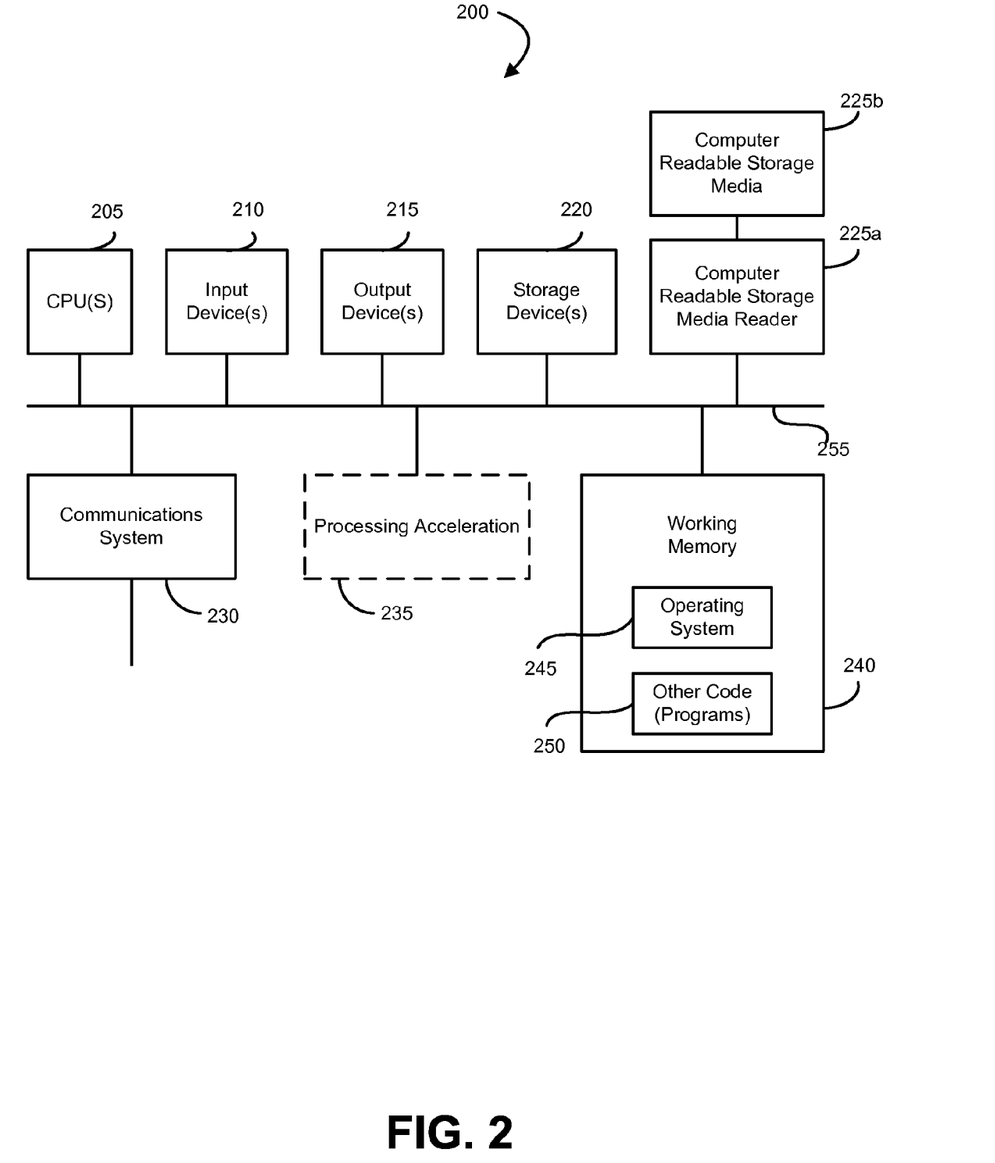
FIG. 2 illustrates a block diagram of an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Each of the methods described herein may be implemented by a computer system, such as computer system 200 in FIG. 2. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

Figure 3:
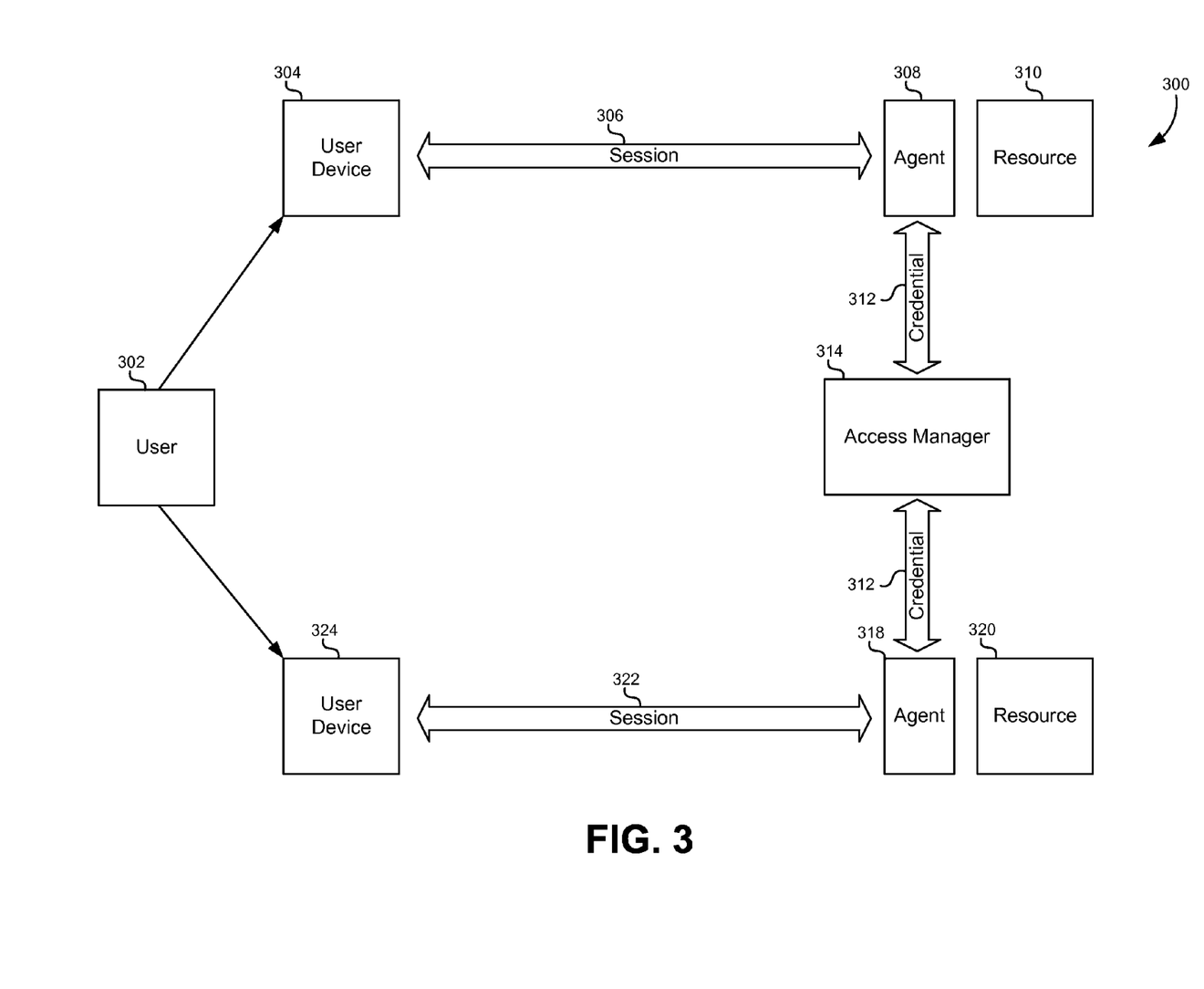
FIG. 3 illustrates a system diagram for establishing communication sessions with a plurality of agents, according to one embodiment.

FIG. 3 illustrates a system diagram 300 for establishing communication sessions with a plurality of agents, according to one embodiment. In this embodiment, a single user 302 may attempt to access protected resources using a plurality of user devices. User 302 may use user device 304 (such as a workstation) to attempt to access protected resource 310. Similarly, user 302 may use a second user device 324 (such as a smart phone) to attempt to access protected resource 320.

For purposes of this example, it can be assumed that a security policy implemented by an access manager 314 only allows a single communication session for the particular user 302. As part of establishing a first communication session 306, the user 302 may be required to provide a credential 312 to the access manager 314 for authentication and/or authorization. If the access manager 314 successfully authenticates the credential 312, the first communication session 306 may be established between the user device 304 and the protected resource 310. Note that in this particular embodiment, the first communication session 306 involves the agent 308 and is monitored by the access manager 314.

After the first communication session 306 is established, the user 302 may attempt to use user device 324 to establish a second communication session 322 with the protected resource 320. In this case, because user device 324 is different from user device 304, a cookie or identifier that would be stored on user device 304 would not typically be found on user device 324. Therefore, in order to grant access to protected resource 320, the access manager 314 would need to establish the second communication session 322. In other words, accessing a protected resource using two different user devices may require two different communication sessions to be established.

When the access manager 314 receives the request from user device 324, it may require the credential 312 to be provided. The credential may include a username and password combination, or any other means of identifying the user 302. The access manager 314 may determine that the first communication session 306 is currently being maintained and is associated with the same user 302. In some cases, the credential 312 provided by agent 308 and the credential provided by agent 318 may be the same. In other embodiments, the credential 312 may include the same identifying fields, such as a username or user ID while allowing for differing fields, such as a device ID, MAC address, or IP address.

The access manager 314 may also determine whether adding the second communication session 322 would violate the security policy. If it violates the security policy (as would be the case when only a single user session is allowed), then the access manager 314 can determine whether to terminate the first communication session 306 and establish the second communication session 322, or to maintain the first communication session 306 and refuse the second communication session 322.

In some embodiments, this determination may be based upon a rank assigned to each agent 308, 318 involved in the communication sessions 306, 322. The rank may be predetermined and statically defined for each agent. In other embodiments, the rank may be dynamically determined based on a type of resource being accessed, a type of interaction with the resource, an authentication policy, an access list, a user authorization associated with the resource, and/or the like. For example, agent 308 may be an Enterprise portal, while agent 318 may be a Web gate. Agent 308 may be statically assigned a higher ranking than agent 318, signifying that sessions associated with Enterprise resources are ranked higher than sessions associated with Web resources.

In another embodiment, the rank may be dynamically or statically determined based on a type of access. For example, if the first communication session 306 involves an ongoing file transfer, then agent 308 may be assigned a relatively high ranking. In contrast, if the second communication session 322 would involve accessing information that is available at any time, the second agent 318 may be assigned a relatively low ranking. The ranking of agent 308 may be reduced after the file transfer is completed.

In another embodiment, the rank may be determined based on a type of data accessed. For example, if the first communication session 306 involves access to critical data, then agent 308 may be assigned a relatively high rank. In contrast, if the second communication session 322 involves access to noncritical data, then agent 318 may be assigned a relatively low rank. The ranking for each agent may change as the type of data accessed changes throughout the communication session.

In another embodiment, the rank may be determined based on an authentication policy. For example, if the resources protected by agent 308 are subject to a stringent authentication policy, then agent 308 may be assigned a relatively high rank. In contrast, if the resources protected by agent 318 are subject to a less stringent authentication policy, then agent 318 may be assigned a relatively low rank.

In another embodiment, the rank may be determined based on a user credential, an access list, and/or an authorization policy. For example, the resources protected by agent 308 may require a user to belong to a certain access list. The access list may be used to assign agent 308 a relatively high ranking. In contrast, the resources protected by agent 318 need not use an access list, or might involve a less restrictive access list. Therefore, agent 318 may be assigned a relatively low ranking.

In another embodiment, the rank may be determined based on application type that is being accessed. For example, agent 308 may protect a purchasing application. The ESS may determine that purchasing applications should receive a relatively high ranking. In contrast, agent 318 may protect a time entry application. The ESS may determine that time entry application should receive a relatively low ranking. In some cases, the situation may be generalized by ranking determinations that implement a policy that the more difficult it would be to recover data lost from a terminated communication session, the higher the ranking associated with the agent should be.

In another embodiment, the rank may be determined based on a type of user device associated with the resource request. For example, agent 308 may be configured to accept requests from workstations within a local area network (LAN). These workstations may be deemed more secure than other types of user devices, and therefore agent 308 may be associated with a relatively higher ranking. In contrast, agent 318 may be configured to accept requests from mobile devices outside of a local or protected network. These devices may be deemed less secure than other types of user devices, and therefore agent 318 may be associated with a relatively low ranking.

In some embodiments, a rank assigned to an agent may be determined based on a plurality of the factors described above. In other words, one or more of the embodiments described above may be combined to assign a ranking to an agent. Some factors may be weighted more heavily than others. For example, an agent ranking may be determined based on a resource type and an authentication policy. The resource type may be weighted less than the authentication policy, such that the authentication policy contributes more to the agent ranking. The weights assigned to each factor may be determined by the security policy implemented by the access manager 314.

In some embodiments, a default ranking may be assigned to each agent. The default ranking may be used as the agent ranking unless the agent 308 otherwise updates the agent ranking by making a dynamic determination. For example, agent 308 may be assigned a relatively low default ranking if it protects low priority data. However, agent 308 may dynamically increase its agent raking above the default ranking during an active file transfer with the user device 304. When the file transfer is complete, the agent ranking of agent 308 may revert to the default ranking.

In some embodiments, the rank assigned to an agent may be different for each user device. For example, agent 308 may have a relatively high ranking assigned for a particular user involved in a file transfer. Agent 308 may also have a relatively low ranking assigned for a particular user accessing static data. In other embodiments, the rank assigned to an agent may be the same for each user.

The access manager 314 may determine a ranking assigned to each of agent 308 and agent 318 in order to determine whether to allow the second communication session 322 to be established. In some embodiments, the access manager may compare rankings associated with each session and give priority to the session associated with the highest ranked agents. For example, if the rank assigned to agent 308 is higher than a rank assigned to agent 318, then the first communication session 306 may be maintained while the second communication session 322 may be refused. Alternatively, if the rank assigned to agent 318 is higher than the rank assigned to agent 308, then the first communication session 306 may be terminated and the second indication session 322 may be established.

Figure 4:
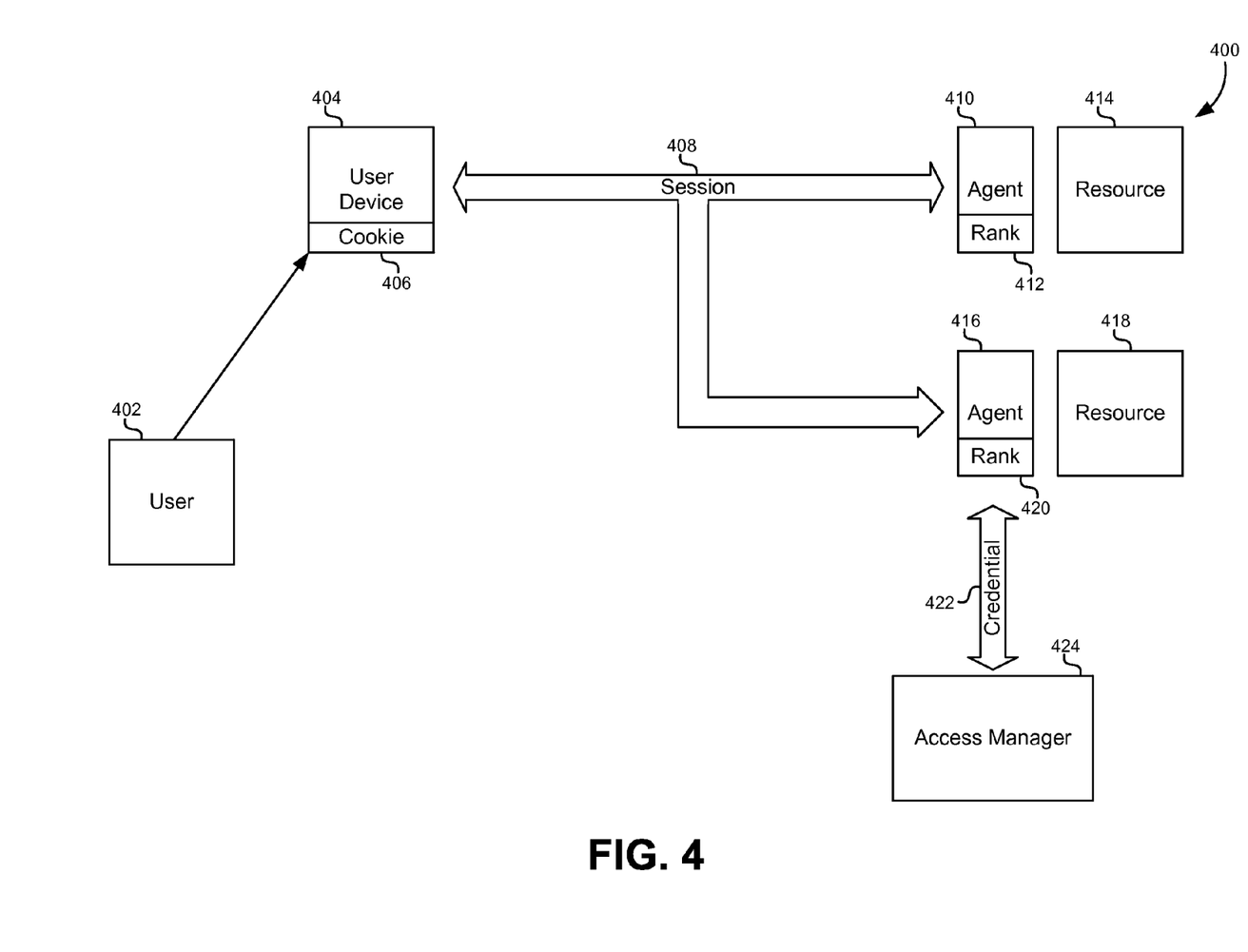
FIG. 4 illustrates a system diagram for establishing a communication session with multiple agents, according to one embodiment.

FIG. 4 illustrates a system diagram 400 for establishing a communication session with multiple agents, according to one embodiment. This embodiment may illustrate a situation where the user device 404 is associated with a communication session 408 involving a plurality of agents. In this example, the user device 404 may request access to resource 414 as well as resource 418. Resource 414 may be protected by agent 410, while resource 418 may be protected by agent 416. Agent 410 and agent 416 may intercept these requests and forward them to the access manager 424. A credential 422 may be provided to the access manager 424 in order to authenticate and/or authorize the user 402. The access manager 424 may then establish the communication session 408 between the resources 414, 418 and the user device 404.

In some cases, the communication session 408 may initially only involve user device 404 and agent 410 to access a single resource 414. The request for resource 418 may take place after communication session 408 is already established. The access manager 424 may determine that the user 402 is the same by virtue of one or more fields within the credential 422. The access manager 424 may also determine that the user device 404 is the same by virtue of a MAC address, an IP address, a device identifier, and/or the like. A cookie 406 may be stored on the user device 404 and be used to maintain or identify the communication session 408.

When the communication session 408 is associated with both agent 410 and agent 416, determinations involving terminating the communication session 408 in favor of a newly requested communication session may be based on the ranking of both agents. For example, agent 410 may be assigned a rank 412. The rank 412 may be a composite of various factors described above, such as access type, resource type, authentication policy, file transfer, user privilege, and/or the like. Similarly, agent 416 may be assigned rank 420. Rank 420 may also be a composite of various factors. Rank 412 and rank 420 may also be based on single factors.

If a second communication session is requested by the same user from a different user device, then the determinations involving the communication session 408 may be based on both rank 412 and rank 420. In some embodiments, the highest ranking may be used. In some embodiments, the lowest ranking may be used. In some embodiments, rank 412 and rank 420 may be combined to form a composite rank. For example, rank 412 may be weighted more heavily than rank 420 if resource 414 was accessed more recently than resource 418.

The use of two agents by a single communication session 408 in this particular embodiment is merely exemplary, and not meant to be limiting. Other embodiments may allow for more than two agents to be associated with a single communication session. For example, communication session 408 may be associated with a third agent having a third ranking in order to access a third resource. In some embodiments, a security policy may limit a particular communication session to a single agent. In these cases, each request to a different agent (even from the same user device) may require a separate communication session.

Figure 5:
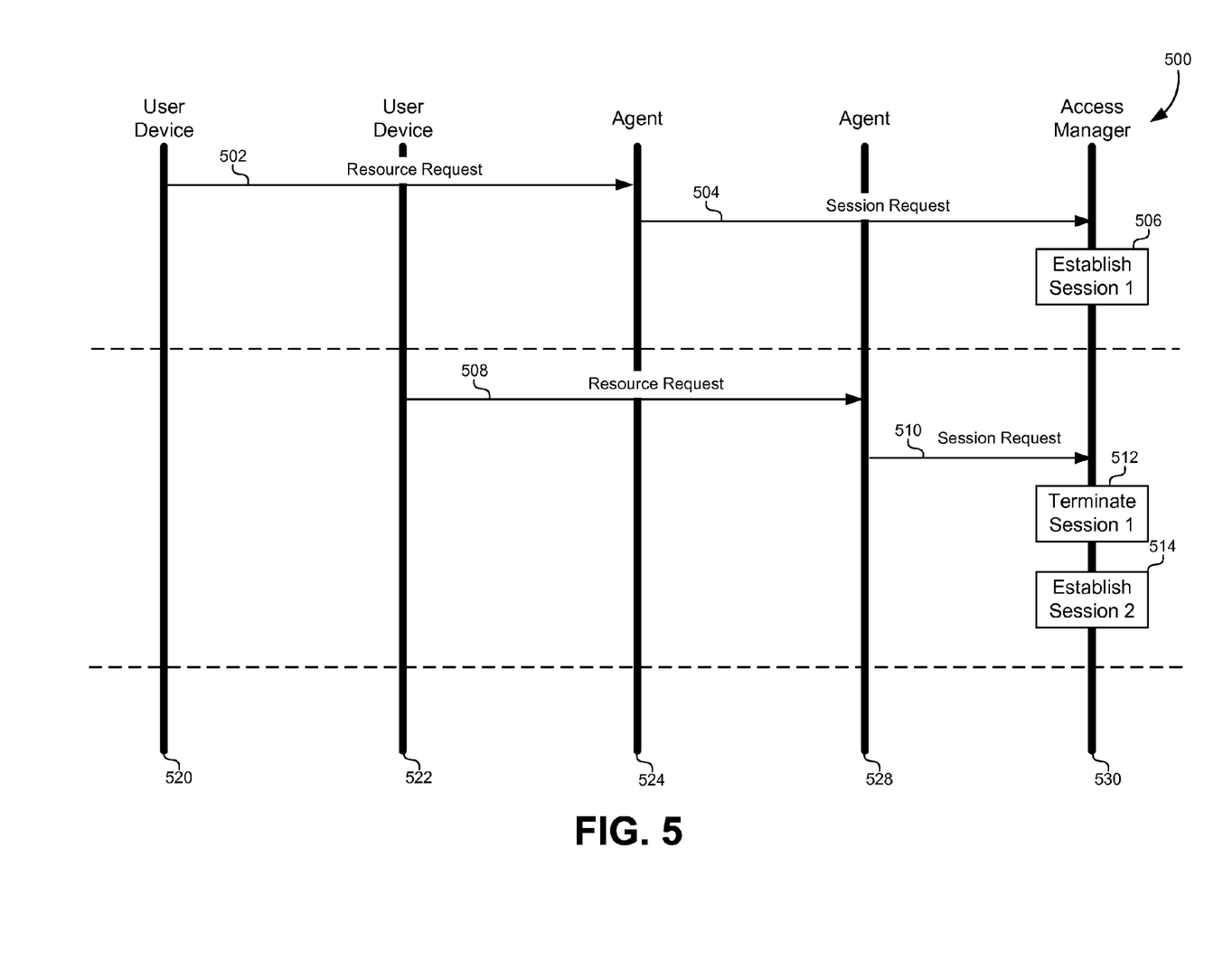
FIG. 5 illustrates a swim diagram for transactions between user devices, agents, and an access manager, according to one embodiment.

FIG. 5 illustrates a swim diagram 500 for transactions between user devices, agents, and an access manager, according to one embodiment. This flow of transactions is merely exemplary, and not meant to be limiting. The actual transaction flow may be altered significantly depending upon the particular embodiment, different Enterprise Software Systems may use varying transaction flows based on how the agents and the access manager are configured to handle authentications, authorizations, credential requests and transfers, communication session establishment, and/or resource access. The embodiment illustrated by swim diagram 500 is provided merely to present an enabling disclosure.

In this embodiment, user device 520 may send a resource request to access a protected resource. Agent 524 may intercept the request from user device 520 (502). Agent 524 may forward the request to access manager 530 (504). Access manager 530 may establish a first communication session between user device 520 and the requested resource (506).

After a variable time interval following the establishment of the first communication session, user device 522 may request access to another protected resource. Note that in some cases, the protected resource requested by user device 522 may be the same as the protected resource requested by user device 520, the difference being that the requests originated from different user devices. In other cases, the protected resources may be different. Agent 528 may intercept the request from user device 522 (508). Note that in cases where the protected resources the same, agent 524 may be the same as agent 528. Agent 528 may forward the request to access manager 530 (510).

At this point, access manager 530 may determine that establishing the second communication will violate a security policy if the first communication session is maintained. Access manager 530 may also determine that the first communication session should be terminated (512) and that the second communication session should be established (514) based on a ranking assigned to agent 524 and a ranking assigned to agent 528. Alternatively, access manager 530 may determine that the first communication session should be maintained and the request to establish a second communication session should be refused (not shown). Alternatively, access manager 530 may determine that establishing the second communication session will not violate a security policy, and thus the second communication session may be established without regard for the first communication session (also not shown).

The transactions involved in actually accessing the resource and establishing the communication sessions are not shown for brevity. The details of these types of transactions may be dependent upon the particular embodiment.

Figure 6:
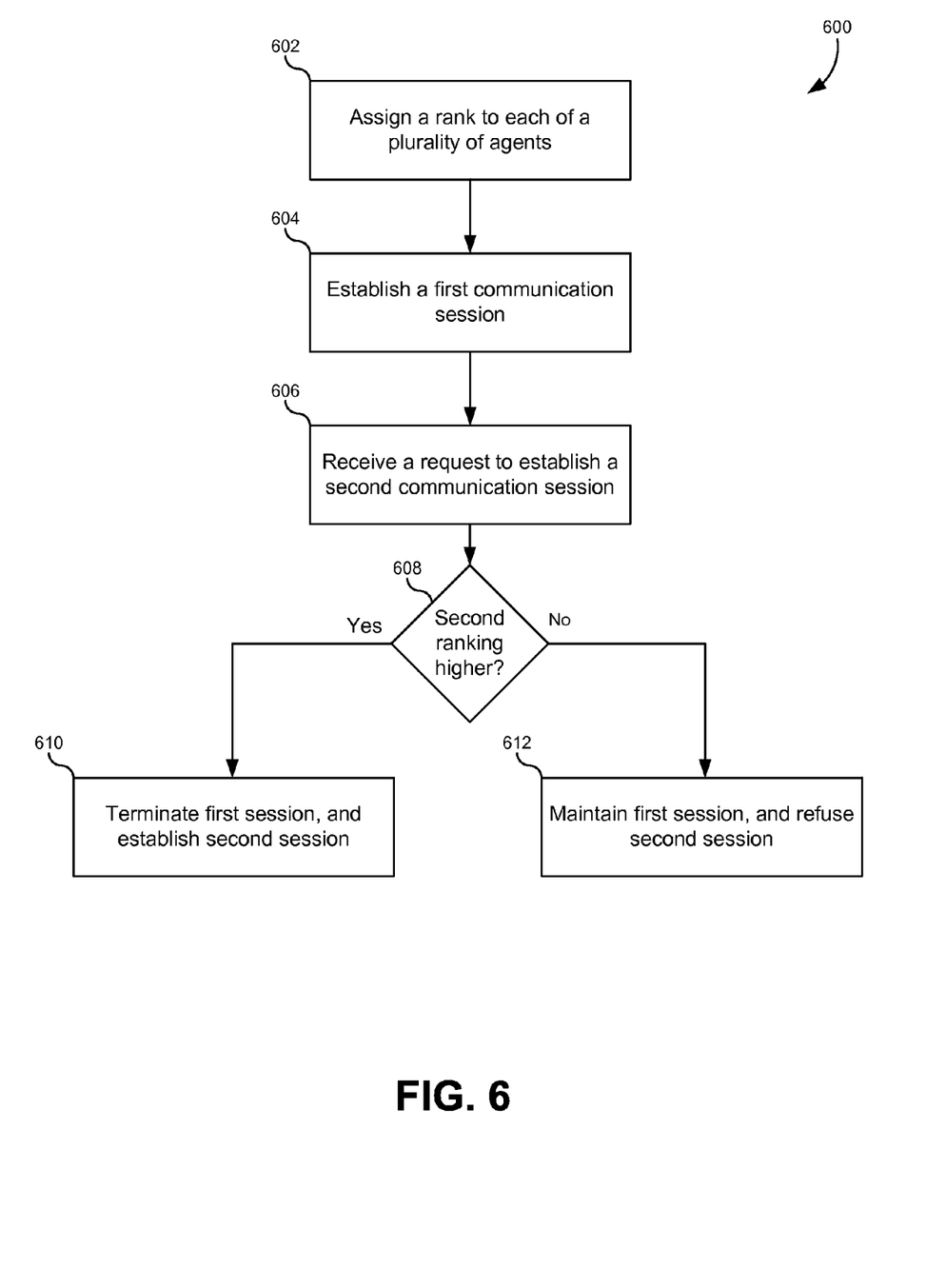
FIG. 6 illustrates a flowchart of a method of handling a plurality of session requests at an access manager, according to one embodiment.

FIG. 6 illustrates a flowchart 600 of a method of handling a plurality of session requests at an access manager, according to one embodiment. The method may include assigning a rank each of a plurality of agents (602). In some embodiments, each of the plurality of agents may forward requests for protected resources to the access manager for authentication and/or authorization. In some embodiments, the access manager may establish a plurality of sessions between user devices and the plurality of agents.

The method may also include establishing a first communication session (604). The first communication session may be establish in response to a request from a first user device to access the protected resource. The protected resource may be protected by a first agent that forwards the request to the access manager. The first communication session may be associated with the first agent, the first user device, and a user credential. As used herein, any communication session may also be referred to simply as a "session." The first device may be any computing device, such as a computer terminal.

The first agent may be assigned a first rank. The first rank may be a default value, a statically assigned value, or a value that is dynamically determined at different points during the first communication session. The first rank may be a composite value determined by a plurality of factors, or may be determined by a single factor. In some embodiments, the first rank may be based on an authentication policy associated with the first agent. In some embodiments, the first rank may be based on a security level of a resource protected by the first agent. In some embodiments, the first rank may be based on a security level of a resource protected by the first agent. In some embodiments, the first rank may be based on one or more of the factors described previously in this disclosure.

The method may additionally include receiving a request to establish a second communication session (606). The request to establish a second communication session may be associated with a second agent in the plurality of agents that is assigned a second rank. The request may also be associated with a second user device and with the same user credential. Note that the credential need not be identical, however, the credential may include similar fields that identify the same user or user group. In some embodiments, the second agent may be a Web gate protecting a resource available to mobile devices. In some embodiments, the second agent may comprise a Gateway governing access to an application hosted by an ESS. In some embodiments, the first agent and the second agent may be the same agent. In other embodiments, the first agent and the second agent may be distinct agents. The second rank may be assigned to the second agent statically, dynamically, or as a default based on any of the factors and methods described previously in this disclosure. In some embodiments, the second user device may comprise a smart phone, or any other computing device.

The method may optionally include using a security policy implemented by the access manager to determine whether establishing the second session would violate the security policy. In one embodiment, the first rank may indicate that the first session should always receive precedence over any second sessions according to the security policy. For example, the first session may comprise a file transfer through the first agent. The access manager may be configured to allow only a single session per credential, according to the security policy. Other embodiments may allow more than one session per credential.

The method may further include determining whether the second session should be established based on the first rank and the second rank (608). In this particular embodiment, this determination may be made by comparing the first rank and the second rank and determining if the second rank is higher than the first rank. In other embodiments (not shown), this determination may be made using other qualitative and/or quantitative factors to compare the rankings. For example, these factors may include bandwidth considerations, frequency of access, network traffic, and/or the like.

In some embodiments, the first session may also be associated with a third agent having a third rank. Determining whether the second session should be established may also be based on a combination of the first rank and the third rank. In other embodiments, more than two rankings may be associated with the first communication session.

The method may also include terminating the first session and establishing the second session (610). In this case, an indication may be sent to the first user device or the second user device indicating that the first session was terminated. Alternatively, the method may include maintaining the first session and refusing to establish the second session (612). In this case, an indication may be sent to the first user device or the second user device indicating that the second session was refused.

It should be appreciated that the specific steps illustrated in FIG. 6 provide particular methods of handling a plurality of session requests at an access manager according to various embodiments. Other sequences of steps may also be performed according to alternative embodiments. For example, alternative embodiments may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
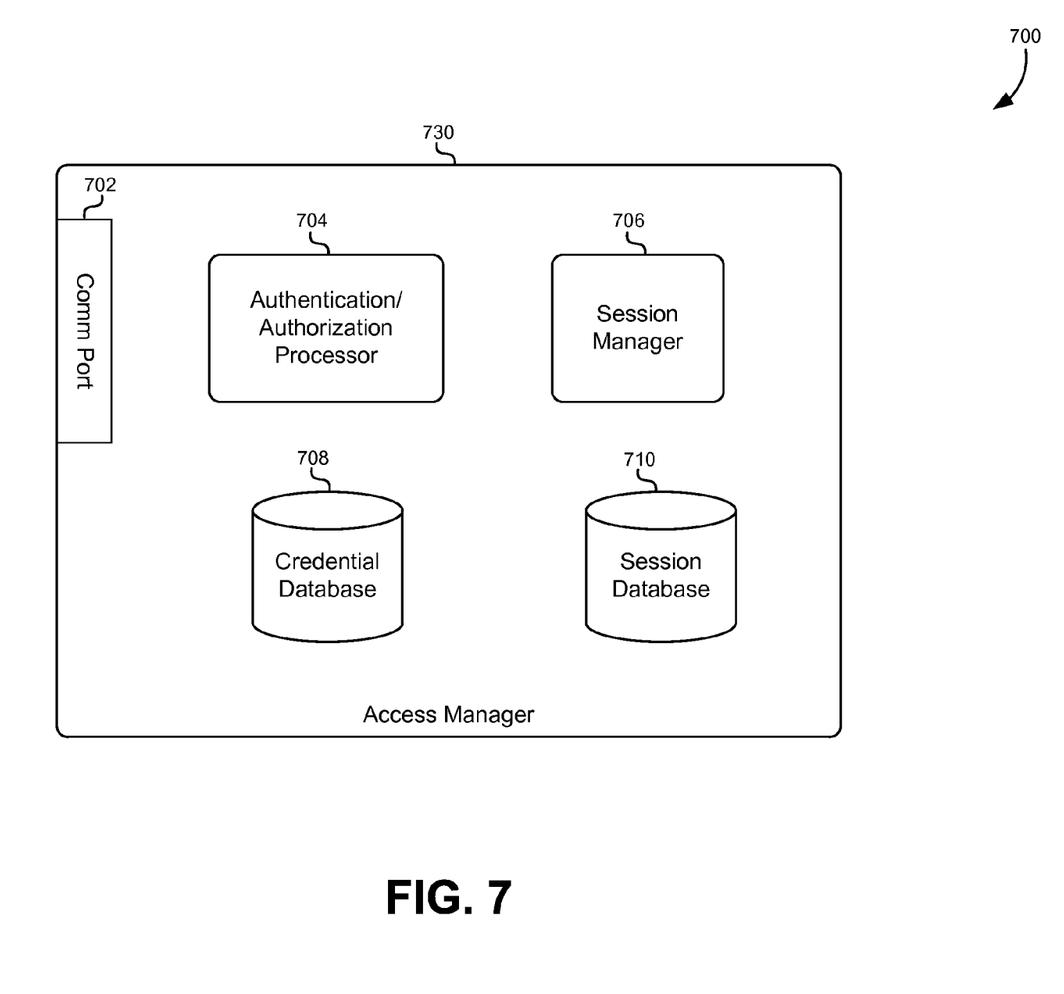
FIG. 7 illustrates a block diagram of an access manager, according to one embodiment.

FIG. 7 illustrates a block diagram 700 of an access manager 730, according to one embodiment. As described above, the methods and systems described herein may be implemented using a general purpose computer system and/or a network computer environment, such as those described in relation to FIG. 1 and FIG. 2. In other embodiments, a dedicated hardware platform may be designed to implement the functionality described herein. This dedicated hardware may be designed using processors, memories, microcontrollers, buses, communication ports, network access ports, adapters, digital circuits, analog circuits, instruction sets, and/or the like, that are well-known in the art and would be readily understood by one having skill in the art. Block diagram 700 represents an abstraction of the functions that may be implemented using these types of hardware. After reading this disclosure, one having skill in the art could use these well-known circuits elements to construct the device shown in FIG. 7 to implement these methods and systems.

An access manager 730 may include a communication port 702 configured to receive requests forwarded from a plurality of agents protecting resources within an ESS. The communication port may provide requests to a session manager 706. The session manager 706 may be configured to maintain, categorize, established, terminate, and/or monitor communication sessions between the plurality of user devices and a plurality of agents/resources. The session manager 706 may be used to implement a security policy that limits the number of sessions available for each user device and/or user credential. The session manager 706 may be constructed using various processor elements, memory elements, and circuit interfaces. The session manager 706 may use a session database 710 to store information about active communication sessions, as well as inactive or past communication sessions.

An authentication/authorization processor 704 may also be provided by the access manager 730 an implemented using well-known processors, microprocessors, and/or memory elements. The authentication/authorization processor 704 may be used to receive, request, and/or process requests for authentication/authorization received through the communication port 702. The authentication/authorization processor 704 may implement well-known authentication algorithms including hashing algorithms, salting algorithms, keying algorithms, and/or the like. The authentication/authorization processor 704 may be communicatively coupled to a credential database 708 that can be used to store secure credential information for a plurality of users, the secure credential information may include access lists, salted usernames and/or passwords, cryptographic challenges, and/or the like. Information stored in the credential database 708 may be used by the authentication/authorization processor 702 to determine whether access should be granted to a protected resource and whether a communication session should be established by the session manager 706.

It will be understood that the hardware modules depicted by block diagram 700 are merely exemplary and not meant to be limiting. Many other ways to implement the functionalities described herein using particular hardware and/or software will be recognized by one having skill in the art in light of this disclosure. In one embodiment, the various modules and systems in FIG. 7 may reside on separate computer systems. Alternatively, multiple modules may be combined on the same or similar computer systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of handling a plurality of session requests at an access manager, the method comprising:
    assigning a rank to each of a plurality of agents, wherein:
        each of the plurality of agents forwards requests for protected resources to the access manager for authentication and/or authorization; and
        the access manager establishes a plurality of sessions between user devices and the plurality of agents;
    establishing, by the access manager, a first session that is associated with:
        a first agent in the plurality of agents that is assigned a first rank,
        a first user device, and
        a user credential;
    receiving a request to establish a second session that is associated with:
        a second agent in the plurality of agents that is assigned a second rank,
        a second user device, and
        the user credential;
    determining whether the second session should be established based on the first rank and the second rank.

2. The method of claim 1 wherein the first rank indicates that the first session should always receive precedence.

3. The method of claim 2 wherein the first session comprises a file transfer through the first agent.

4. The method of claim 3 wherein the access manager is configured to allow only a single session per credential.

5. The method of claim 1 wherein the first device comprises a computer terminal and the second device comprises a smart phone.

6. The method of claim 1 wherein the first rank is based on an authentication policy associated with the first agent.

7. The method of claim 1 wherein the first rank is based on a security level of a resource protected by the first agent.

8. The method of claim 1 wherein the first rank is based on a resource type of a resource protected by the first agent.

9. The method of claim 1 wherein the first session is also associated with a third agent having a third rank, and the determining as to whether the second session should be established is also based on a combination of the first rank and the third rank.

10. The method of claim 1 further comprising, in response to a determination that the second session should be established, terminating the first session.

11. The method of claim 1 further comprising, in response to a determination that the second session should not be established, sending an indication to the second user device indicating that the second session has been refused.

12. The method of claim 1 wherein the first agent and the second agent are the same agent.

13. The method of claim 1 wherein the first agent comprises a WebGate.

14. The method of claim 1 wherein the second agent comprises a gateway controlling access to an application hosted by an Enterprise Software System.

15. A computer-readable memory comprising a sequence of instructions which, when executed by one or more processors, causes the one or more processors to handle a plurality of session requests at an access manager by:
    assigning a rank to each of a plurality of agents, wherein:
        each of the plurality of agents forwards requests for protected resources to the access manager for authentication and/or authorization; and
        the access manager establishes a plurality of sessions between user devices and the plurality of agents;
    establishing, by the access manager, a first session that is associated with:
        a first agent in the plurality of agents that is assigned a first rank,
        a first user device, and
        a user credential;
    receiving a request to establish a second session that is associated with:
        a second agent in the plurality of agents that is assigned a second rank,
        a second user device, and
        the user credential;
    determining whether the second session should be established based on the first rank and the second rank.

16. The computer-readable memory according to claim 15 wherein the first rank is based on an authentication policy associated with the first agent.

17. The computer-readable memory according to claim 15 wherein the first rank is based on a security level of a resource protected by the first agent.

18. The computer-readable memory according to claim 15 wherein the first rank is based on a resource type of a resource protected by the first agent.

19. A system comprising:
    one or more processors; and
    a memory communicatively coupled with and readable by the one or more processors and comprising a sequence of instructions which, when executed by the one or more processors, cause the one or more processors to handle a plurality of session requests at an access manager by:
        assigning a rank to each of a plurality of agents, wherein:
            each of the plurality of agents forwards requests for protected resources to the access manager for authentication and/or authorization; and
            the access manager establishes a plurality of sessions between user devices and the plurality of agents;
        establishing, by the access manager, a first session that is associated with:
            a first agent in the plurality of agents that is assigned a first rank,
            a first user device, and
            a user credential;
        receiving a request to establish a second session that is associated with:
            a second agent in the plurality of agents that is assigned a second rank, a second user device, and
the user credential;
determining whether the second session should be established based on the first rank and the second rank.

20. The system of claim 19 wherein the first session is also associated with a third agent having a third rank, and the determining as to whether the second session should be established is also based on a combination of the first rank and the third rank.

* * * * *